United States Patent
Halberstadt

(10) Patent No.: US 9,923,461 B2
(45) Date of Patent: Mar. 20, 2018

(54) CONTROL ARRANGEMENT FOR A SWITCHED MODE POWER SUPPLY

(71) Applicant: NXP B.V., Eindhoven (NL)

(72) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/062,473

(22) Filed: Mar. 7, 2016

(65) Prior Publication Data

US 2016/0190920 A1 Jun. 30, 2016

(30) Foreign Application Priority Data

Mar. 13, 2015 (EP) .................................... 15159100

(51) Int. Cl.
*H02M 3/335* (2006.01)
*H02M 1/00* (2006.01)
*H02M 3/156* (2006.01)

(52) U.S. Cl.
CPC ....... *H02M 3/156* (2013.01); *H02M 3/33523* (2013.01); *H02M 2001/0035* (2013.01); *Y02B 70/16* (2013.01)

(58) Field of Classification Search
CPC .............. H02M 2001/0032; H02M 2001/0035
USPC ....... 323/241–243, 274, 280, 283, 284, 288; 363/21.13, 21.15, 21.18, 78, 79
See application file for complete search history.

(56) References Cited

U.S. PATENT DOCUMENTS

| | | | | |
|---|---|---|---|---|
| 7,064,968 B2* | 6/2006 | Choi | ................. | H02M 3/33523 363/21.12 |
| 7,529,105 B1* | 5/2009 | Choi | ................. | H02M 3/33523 363/131 |
| 8,102,679 B2* | 1/2012 | Gong | .................... | H02M 3/156 363/21.04 |
| 8,519,688 B2 | 8/2013 | Halberstadt | | |
| 9,143,043 B2* | 9/2015 | Zhang | ............... | H02M 3/33546 |
| 9,306,460 B2* | 4/2016 | Sorensen | ............. | H02M 3/337 |

(Continued)

FOREIGN PATENT DOCUMENTS

| | | |
|---|---|---|
| EP | 2 683 068 A1 | 1/2014 |
| EP | 2717450 | 4/2014 |
| WO | WO-2006/120640 A2 | 11/2006 |

OTHER PUBLICATIONS

Extended European Search Report for application 15159100.5 dated Sep. 11, 2015.

*Primary Examiner* — Gary Nash

(57) ABSTRACT

The disclosure relates to a control arrangement for a SMPS, the control arrangement comprising: an input terminal configured to receive a feedback-signal (V1) representative of an output of the SMPS; a normal-mode-processing-arrangement-configured to process the feedback-signal and provide a normal-mode-control-signal for operating the SMPS in a normal mode of operation; a burst-mode-processing-arrangement configured to process the feedback-signal and provide a burst-mode-control-signal for operating the SMPS in a burst mode of operation; and a feedback-control-processing-arrangement configured to operate the SMPS such that the feedback signal in the normal mode of operation has a predetermined relationship with the feedback signal in the burst mode of operation.

16 Claims, 10 Drawing Sheets

(56) References Cited

U.S. PATENT DOCUMENTS

2009/0097289 A1* 4/2009 Schetters .......... H02M 3/33523
  363/84
2013/0215651 A1  8/2013 Liao et al.
2014/0185332 A1  7/2014 Tazawa
2014/0301117 A1  10/2014 Hirabayashi

* cited by examiner

CONTROL ARRANGEMENT FOR A SWITCHED MODE POWER SUPPLY

This disclosure relates to switch mode power supplies, control arrangements therefore and methods of operating switch mode power supplies.

CROSS-REFERENCE TO RELATED APPLICATIONS

This application claims the priority under 35 U.S.C. §119 of European patent application no. 15159100.5, filed Mar. 13, 2015 the contents of which are incorporated by reference herein.

In many varieties of switch mode power supplies, an output parameter—typically output voltage—is regulated by means of an error derived in an error amplifier on the output or secondary side of the SMPS; a signal corresponding to the error is transmitted to the primary or input side, typically by means of an opto-coupler to maintain electrical isolation between the input and output sides. Such power supplies are often used in combination with consumer applications, such as adapters for laptops, cell phones, TV, desktop PCs and the like.

According to a first aspect there is provided a control arrangement for a SMPS, the control arrangement comprising:
- an input terminal configured to receive a feedback-signal representative of an output of the SMPS;
- a normal-mode-processing-arrangement configured to process the feedback-signal and provide a normal-mode-control-signal for operating the SMPS in a normal mode of operation;
- a burst-mode-processing-arrangement configured to process the feedback-signal and provide a burst-mode-control-signal for operating the SMPS in a burst mode of operation; and
- a feedback-control-processing-arrangement, which may be configured to operate the SMPS such that the feedback signal in the normal mode of operation has a predetermined relationship with the feedback signal in the burst mode of operation.

Use of such a predetermined relationship can enable the SMPS to change modes of operation more effectively and can result in a better-defined output voltage of the SMPS.

The feedback-control-processing-arrangement may be configured to set a level of the feedback signal in the normal mode of operation such that it has a predetermined relationship with a level of the feedback signal that is used to transition to the burst mode of operation. The feedback-control-processing-arrangement may be configured to set a level of the feedback signal that is used to transition to the burst mode of operation such that it has a predetermined relationship with a level of the feedback signal in the normal mode of operation.

The predetermined relationship may be a fixed/constant difference. The difference may be an absolute difference or a proportion of a level.

The normal-mode-processing-arrangement may be configured to compare the feedback signal with a normal-mode-reference-signal. The burst-mode-processing-arrangement may be configured to compare the feedback signal with a burst-mode-reference-signal. A relationship between the normal-mode-reference-signal and the burst-mode-reference-signal may correspond to the predetermined relationship between the feedback signal in the normal mode of operation and the feedback signal in the burst mode of operation.

The normal-mode-processing-arrangement may be configured to determine a normal-mode-adaptive-offset-signal in accordance with a result of the comparison between the feedback signal and the normal-mode-reference-signal. The normal-mode-processing-arrangement may be configured to add the normal-mode-adaptive-offset-signal to the feedback-signal in order to provide the normal-mode-control-signal. The normal-mode-processing-arrangement may be configured to set the normal-mode-control-signal as the result of the comparison between the feedback-signal and the normal-mode-reference-signal.

The burst-mode-processing-arrangement may be configured to determine a burst-mode-adaptive-offset-signal in accordance with a result of the comparison between the feedback signal and the burst-mode-reference-signal. The burst-mode-processing-arrangement may be configured to add the burst-mode-adaptive-offset-signal to the feedback-signal in order to provide the burst-mode-control-signal. The burst-mode-processing-arrangement may be configured to set the burst-mode-control-signal as the result of the comparison between the feedback-signal and the burst-mode-reference-signal.

The normal-mode-processing-arrangement may be configured to set the normal-mode-control-signal in accordance with a result of the comparison between the feedback signal and the normal-mode-reference-signal. The burst-mode-processing-arrangement may be configured to set the burst-mode-control-signal in accordance with a result of the comparison between the feedback signal and the burst-mode-reference-signal.

The normal-mode-processing-arrangement may include the feedback-control-processing-arrangement. The feedback-control-processing-arrangement may comprise an offset-summation-component. The offset-summation-component may be configured to provide the normal-mode-control-signal by adding an adaptive-offset-signal to the feedback-signal. The feedback-control-processing-arrangement may further comprise an offset-determination-component. The offset-determination-component may be configured to provide the adaptive-offset-signal in accordance with a difference between the feedback signal and a normal-mode-reference-signal. The feedback-control-processing-arrangement may further comprises an offset-integrator-component. The offset-integrator-component may be configured to low pass filter the adaptive-offset-signal before it is provided to the offset-summation-component.

The control arrangement may comprise a current mirror. The current mirror may comprise an input terminal. The input terminal may be configured to receive a current-domain-feedback-signal. The input terminal may be configured to behave like a voltage source with a fixed voltage level. The current mirror may comprise an output terminal configured to provide the feedback-signal.

The control arrangement may comprise an end-burst-mode-output-terminal. The control arrangement may comprise an end-burst-mode-processing-arrangement. The end-burst-mode-processing-arrangement may be configured to compare the feedback-signal with an end-burst-reference-signal. The end-burst-mode-processing-arrangement may be configured to provide an end-burst-mode-control-signal to the end-burst-mode-output-terminal. The end-burst-reference-signal may have a predetermined relationship with the normal-mode-reference-signal and/or the burst-mode-reference-signal.

The normal-mode-processing-arrangement may comprise an offset-determination-component configured to determine an offset-signal in accordance with the first-feedback-signal and an offset-reference-signal. The normal-mode-processing-arrangement may comprise an offset-application-component configured to add the offset-value to the first-feedback-signal in order to provide the normal-mode-control-signal.

There may be provided a computer program, which when run on a computer, causes the computer to configure any apparatus, including a, circuit, controller, control arrangement, SMPS or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

BRIEF DESCRIPTION OF THE DRAWINGS

One or more embodiments will now be described, by way of example only, and with reference to the accompanying figures in which.

DETAILED DESCRIPTION

One or more examples disclosed herein relate to switch mode power supplies (SMPSs) with mains isolation and communication of regulation information across the mains isolation. The regulation information can be communicated across the isolation using an optocoupler or a transformer, as non-limiting examples.

Figure 1:
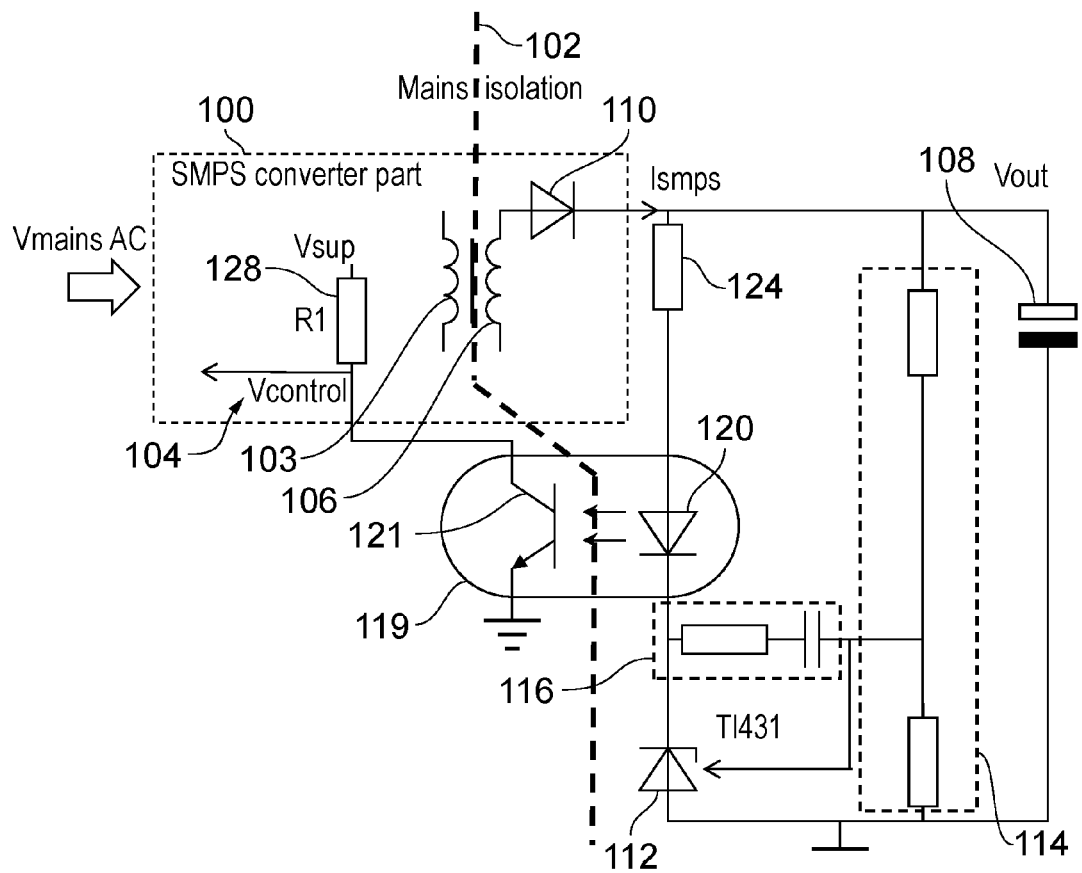
FIG. 1 shows a partial circuit diagram for an example switch mode power supply (SMPS)

FIG. 1 shows an example SMPS 100. The SMPS 100 has mains isolation 102, which is provided by a transformer having a primary winding 103 and a secondary winding 106, thereby defining a primary side and a secondary side of the SMPS 100. Not all features of the SMPS 100 are shown in FIG. 1 because they are well known in the art. The SMPS 100 can be based on several topologies, such as flyback, resonant, forward etc.

The SMPS 100 is connected to a mains AC voltage supply at its primary side (the left-hand side of the mains isolation 102 as it is shown in FIG. 1), and delivers an output current at the secondary winding 106 on the secondary side of the SMPS 100. As shown in FIG. 1, the secondary winding 106 is connected to a buffer capacitor 108 via an output-rectifying-diode 110. At the buffer capacitor 108, an output voltage (Vout) is present and can be connected to a load (not shown).

The output voltage can also be regulated by an error amplifier 112, before being fed back to the primary side of the SMPS 100 so that the primary side can be appropriately controlled. In FIG. 1, the error amplifier 112 is provided by a TL431 component from NXP Semiconductors, which is a 3 pin device. FIG. 1 also includes a resistive divider 114, which is connected across the output, for tapping off a proportion of Vout, and then providing that proportion of Vout to the error amplifier 112 for processing. In this way, a nominal value of Vout can be used by the error amplifier 112. FIG. 1 also shows a compensation network 116, which in this example is a simple RC network, for improving the stability of the feedback without requiring a static offset.

FIG. 1 also shows an optocoupler 119, with an optocoupler-LED 120 on the secondary side of the circuit, and an optocoupler-phototransistor 121 on the primary side of the circuit. The error amplifier 112 is connected in series with the optocoupler-LED 120 and a resistor 124, across the output of the circuit. The resistor 124 contributes to the definition of the loop gain and therefore also contributes to the stability of the feedback loop.

The feedback loop is closed by the optocoupler-phototransistor 121, which provides a control signal (Vcontrol) 104 to a primary side controller (not shown). The control signal (Vcontrol) 104 relates to the power level at the output of the SMPS. This control signal includes a resistive input characteristic defined by a resistor R1 128, which is connected in series with the optocoupler-phototransistor 121 between ground and a voltage supply (Vsup) that is internal to the primary side controller. In this way a change in optocoupler current is converted to a change in Vcontrol 104. The resistance value of resistor R1 128 also contributes to the definition of the gain of the feedback loop.

An important requirement for an SMPS 100 is efficiency. Therefore an SMPS 100 can offer several modes of operation in order to optimize the efficiency over a range of load values. For low load, a burst mode of operation can be used. The burst mode can use a repetitive sequence with a repetition time in the order of 1 ms, for example. During a burst-on-time, the SMPS 100 switches as in normal operation with relatively large power levels with high efficiency. During a burst-off interval, the converter stops switching. In this way, the average power delivered by the SMPS 100 over time is low, whilst still overall achieving a high efficiency. The burst-on-time can be started when Vcontrol 104 crosses a threshold in positive direction, for example Vcontrol=0.5 V. Various methods can be used for setting the burst duration. For example, the burst duration can be set by a local loop that regulates the burst repetition time to a desired value. This feature gives a desired fixed period time and can result in a good compromise between audible noise and low ripple voltage at the output. Both of these properties can be important requirements of the SMPS.

Another important requirement for an SMPS 100 is low power consumption at no load. With the load disconnected, the SMPS 100 will draw a residual power from the mains in order to maintain its own supply, to deliver power to the resistive divider 114 associated with the error amplifier 112, and to provide current for the optocoupler 119. Due to the polarity of the error amplifier 112 in this example, the largest optocoupler current occurs at no load. This issue can be addressed by regulating the optocoupler current to a fixed low value. This can be achieved by using a local loop that compares the actual optocoupler current with a desired optocoupler current, and then slowly adapting the internal supply voltage Vsup such that the actual optocoupler current tends towards the desired optocoupler current. The result is that resistive behaviour occurs for fast changing signals due to R1 128, but for slowly changing signals a low DC bias current is maintained.

Using this fixed low optocoupler current functionality, complications can occur with the burst mode. For example a parasitic capacitance can be present at a node between the optocoupler-phototransistor 121 and R1 128, which is the node from which the Vcontrol signal 104 is supplied. This parasitic capacitance can have a negative effect on the Vcontrol signal 104 because a large time delay occurs for a low optocoupler current, which results in a worse transient response. Another disadvantage arises when a fixed Vcontrol signal 104 is used for starting the burst-on-time, the actual optocoupler current when the burst-on-time starts depends on the value of Vsup, which depends on the power level at the output of the SMPS 100. This means that when a transient occurs from a high power to a low power, it takes time to adapt Vsup to the proper level. The optocoupler current for starting the burst-on-time therefore changes over time, which causes an additional undesired transient at Vout. When the system is in burst mode with relatively high power, the burst-on-time will be close to the burst period time. When a sudden load step occurs to a low power, the burst-on-time cannot be finished. This causes a large overshoot at Vout which is undesired, and is illustrated in FIG. 2 as discussed below.

A further disadvantage encountered in some implementations of the SMPS occur when a relatively slow load reduction from (i) a power demand level in a normal mode of operation to (ii) a power demand level in burst mode of operation. For example, during the normal mode operation in which a high power demand is experienced, the internal supply voltage Vsup is fixed at, for example, 7V and Rsup=12 k. A change in mode to burst mode occurs at Vcontrol=0.5V. During the power reduction in normal operation, Vcontrol slowly reduces as power is directly related to Vcontrol. When Vcontrol reaches 0.5V, the optocoupler current reaches 540 uA ((7V−0.5V)/12 k=540 μA). When Vcontrol reaches 0.5V, the SMPS suddenly changes mode to the burst mode where Vsup is regulated to get a fixed voltage across Rsup, which corresponds to a current of 100 μA in Rsup. However as the optocoupler current is still 540 uA, Vcontrol is pulled fully low instantly, and so triggers a burst off interval after the burst on time has elapsed. The optocoupler current has to fall to 100 μA before Vcontrol can rise again and a next burst on time can be triggered. This, however, requires Vout to make a significant (undesired) undershoot. This result is a significant gap in time where no power is delivered, so giving the undesired transient effect of undershoot at Vout.

Figure 2:
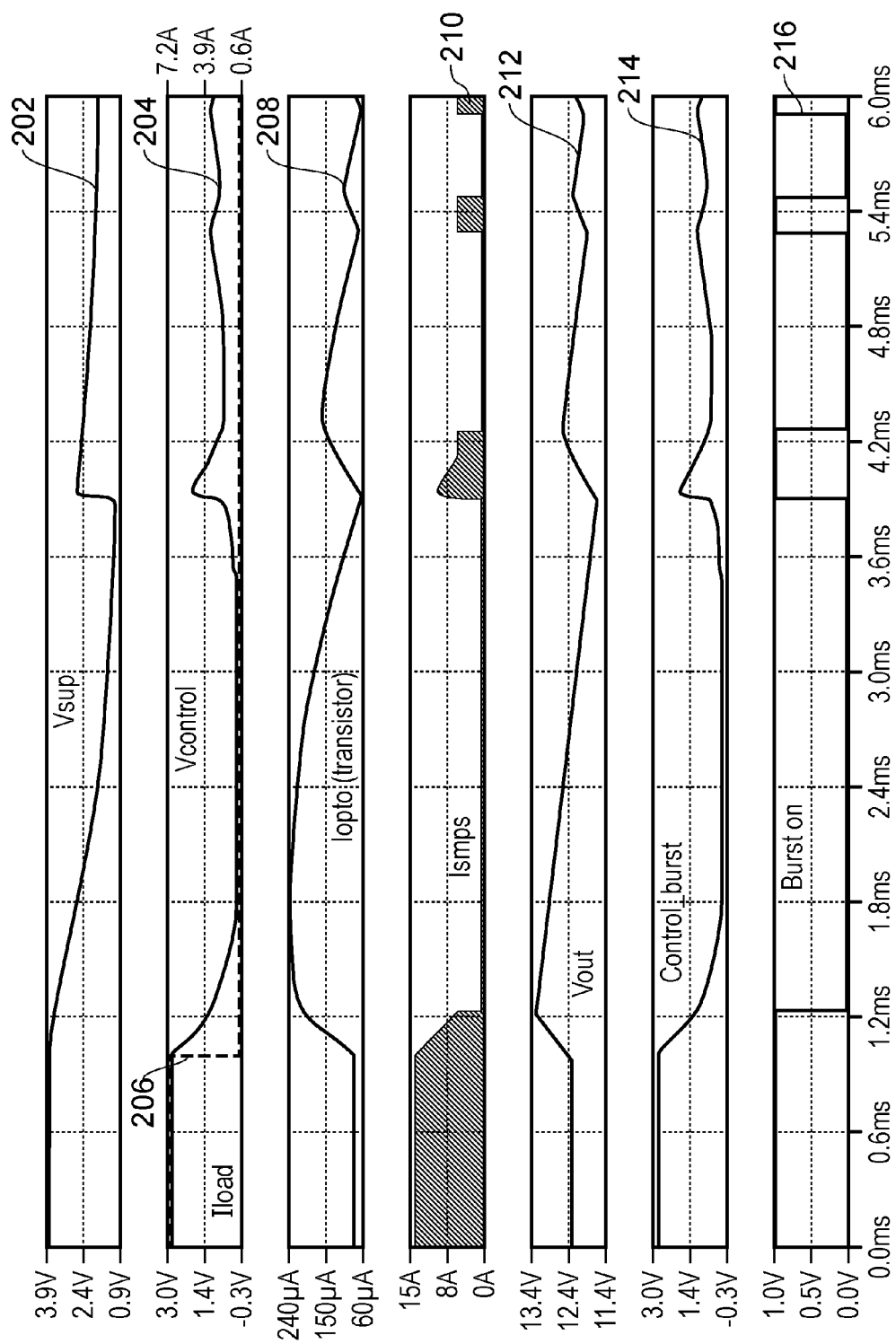
FIG. 2 shows signals for a simulation of the SMPS of FIG. 1.

FIG. 2 shows signals for a simulation of the SMPS of FIG. 1, and includes the following plots:

A first plot that shows Vsup 202, which as discussed above is an internal supply voltage of the primary side controller of the SMPS;

A second plot that shows:
Vcontrol 204, which is the control signal representative of the output of the SMPS, which is provided to the primary side controller of the SMPS;
Iload 206, which is the current drawn by a load connected to the output of the SMPS;

A third plot that shows Iopto(transistor) 208, which is the current that flows through the optocoupler-phototransistor in response to light received from the optocoupler-LED;

A fourth plot that shows Ismps 210, which is the current flowing through the secondary winding of the transformer, after rectification. When current is flowing through the secondary winding of the transformer it is pulsing at a relatively high frequency in the context of the scale of FIG. 2, which is why it appears a solid block in FIG. 2;

A fifth plot that shows Vout 212, which is the output voltage of the SMPS;

A sixth plot that shows Control_burst 214, which has a similar form to Vcontrol 204;

A seventh plot that shows Burst-on 216, which is a burst control signal provided by the primary side controller in accordance with the Vcontrol 204 control signal.

FIG. 2 shows operation of the SMPS, which includes the method discussed above of regulating the optocoupler current during a normal mode of operation by adapting Vsup. In this example, the optocoupler current is regulated to a fixed low value of 80 μA. Also, a burst mode is applied when Vcontrol reaches a fixed value, in this example a burst interval is started when Vcontrol=control_burst=1V. Further details are provided below.

In FIG. 2, at t=0, the converter is in steady state at a load of 7A (as shown by Iload 206). In this example, the normal mode of operation can be interpreted as a continuous burst-on interval, where the power can be increased, but cannot be reduced below a minimum level. In burst mode, the system allows a burst-off interval, during which the SMPS is switched off.

At t=1 ms, a load step in Iload 206 is made to 600 mA, which is below the minimum level for continuous operation under the normal mode of operation. This level of Iload 206 therefore requires that burst mode is activated. As result of the load step, the error amplifier increases the optocoupler current (Iopto(transistor)) 208 and therefore Vcontrol 204 drops. However, due to the fact that Vcontrol 204 is at a high value in order to deliver the required power and that the control loop speed is defined for loop stability, it takes some time for Vcontrol 206 to reach the threshold level of 1V. In this example, it takes about 0.2 ms for the threshold to be reached. This threshold level represents a minimum power level for staying in continuous operation. Therefore, when the threshold is reached, the burst-on-time is finished, as shown by the transition in the burst-on signal 216 from a high level to a low level. In the meantime, Vout 212 rises, as the power cannot be reduced in accordance with the power demand of the load. The 0.2 ms delay (between t=1 ms and t=1.2 ms) between Iload 206 dropping and the converter being switched off results in an overshoot of Vout by about 0.9V, which represents 7.5% and can be greater than a requirement of 5% for some applications.

Figure 3:
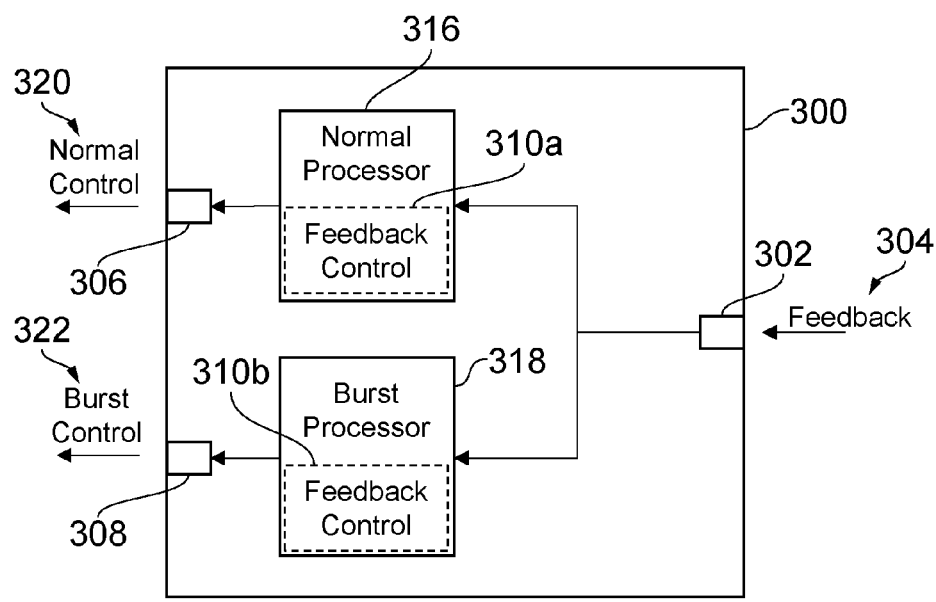
FIG. 3 shows a control arrangement for the SMPS of FIG. 1.

FIG. 3 shows a control arrangement 300 for a SMPS, such as the one illustrated in FIG. 1. As will be discussed below, the control arrangement 300 of FIG. 3 can address some of the disadvantages that are mentioned above.

The control arrangement 300 has an input terminal 302 for receiving a feedback-signal 304 representative of an output of the SMPS. In the context of the SMPS of FIG. 1, the feedback-signal 304 may be received from an optocoupler-phototransistor, and may be representative of an output voltage of the SMPS. The control arrangement 300 also includes a normal-mode-output-terminal 306 and a burst-mode-output-terminal 308. The normal-mode-output-terminal 306 can provide a normal-mode-control-signal 320 that can be used by the primary side controller to set one or more operating parameters of the SMPS during a normal mode of operation (that is, not during a burst mode of operation). The burst-mode-output-terminal 308 can provide a burst-mode-control-signal 322 that can be used by the primary side controller to set one or more operating parameters of the SMPS during a burst mode of operation (that is, not during a normal mode of operation).

It will be appreciated that any or all of the terminals of the control arrangement 300 need not necessarily be external connections; they can be internal connections between different modules within a single processor/integrated circuit. The control arrangement 300 may be provided as part of the primary side controller.

FIG. 3 also shows a normal-mode-processing-arrangement 316 that can process the feedback-signal 304 and provide the normal-mode-control-signal 320 to the normal-mode-output-terminal 306. FIG. 3 also includes a burst-mode-processing-arrangement 318 that can process the feedback-signal 304 and provide the burst-mode-control-signal 322 to the burst-mode-output-terminal 308.

The control arrangement 300 also includes a feedback-control-processing-arrangement 310a, 310b that can be associated with the normal-mode-processing-arrangement 316 and/or the burst-mode-processing-arrangement 318. The feedback-control-processing-arrangement 310a, 310b is configured to operate the SMPS such that the feedback signal 304 in the normal mode of operation has a predetermined relationship with the feedback 304 signal in the burst mode of operation. That is, the feedback-control-processing-arrangement 310a, 310b can set the normal-mode-control-signal 320 or the burst-mode-control-signal 322 such that the feedback signal 304 received by the control arrangement 300 in the two modes of operation have a predetermined relationship. In some examples a level of the feedback signal 304 in the normal mode of operation can have a predetermined relationship with a level of the feedback signal 304 that is used to transition to the burst mode of operation. As will be discussed in more detail below, use of a predetermined relationship can enable the SMPS to change modes of operation more effectively and can result in a better-defined output voltage of the SMPS. One example of a predetermined relationship is a fixed/constant difference between (i) a value of the feedback signal 304 in one of the modes of operation, and (ii) a value of the feedback signal 304 that will cause the SMPS to change to the other mode of operation. This can be a relatively small difference such that, for example, the SMPS can switch from a normal mode of operation to a burst mode of operation quickly, with a relatively low overshoot in the output voltage.

Figure 4:
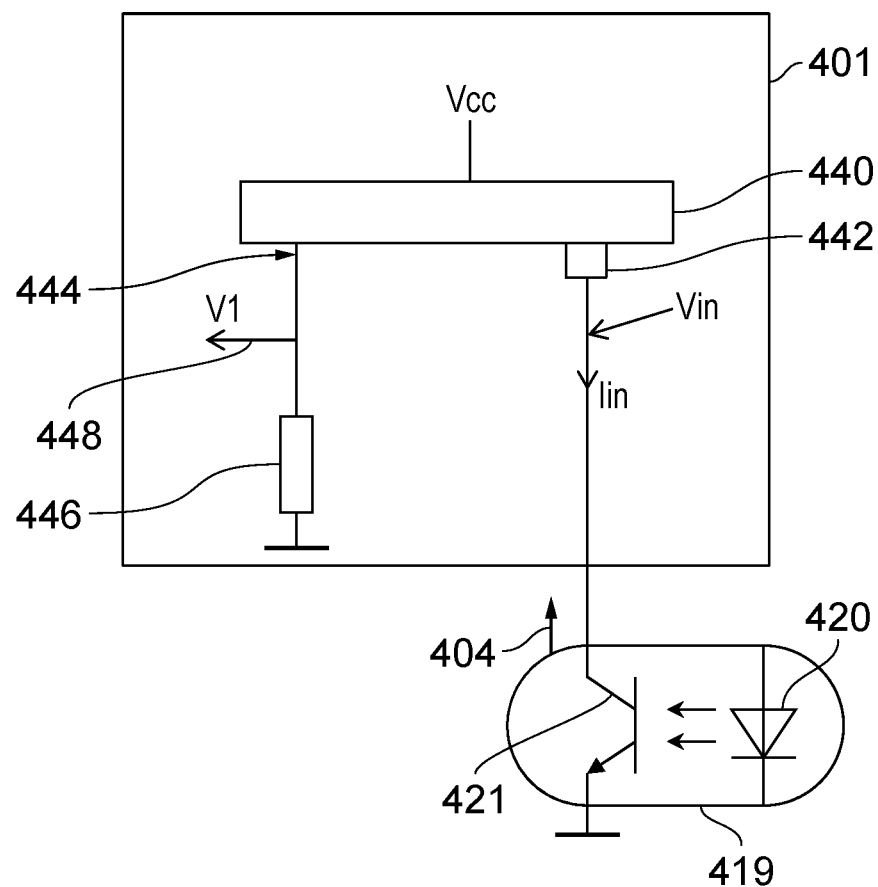
FIG. 4 shows a circuit for providing at least some of the functionality of the control arrangement of FIG. 3.

FIG. 4 shows a circuit 401 that can provide some of the functionality of the control arrangement of FIG. 3. FIG. 4 also shows an optocoupler 419, which is used to transfer information across the mains isolation of an SMPS in a similar way to that described with reference to FIG. 1. The optocoupler 419 includes an optocoupler-LED 420 that transmits light to an optocoupler-phototransistor 421. The optocoupler-phototransistor 421 is connected to an input terminal of the circuit 401, in order to provide a feedback-signal 404 to the circuit 401.

Figure 10:
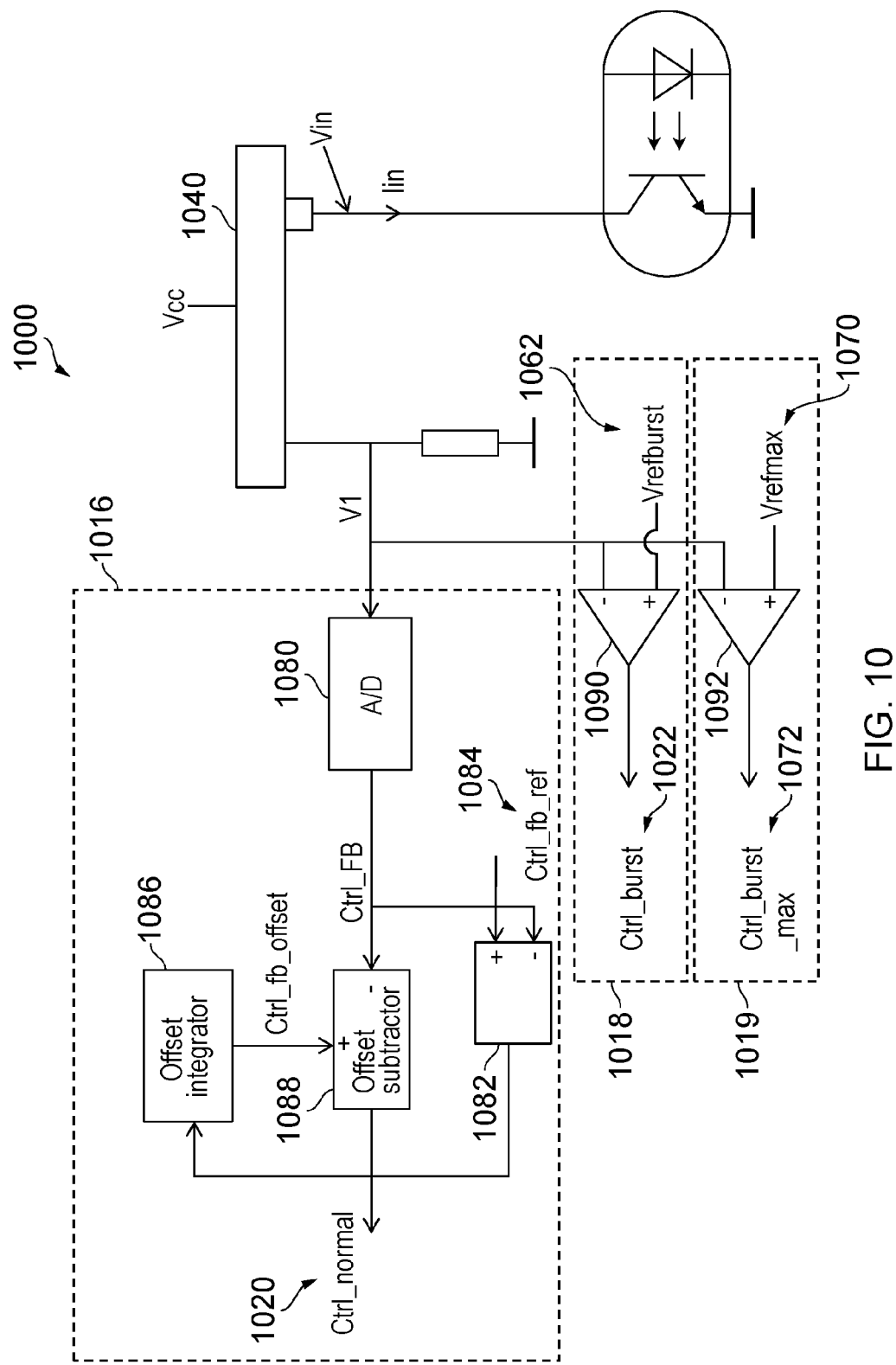
FIGS. 10 and 11 show further examples of control arrangements.

The circuit 401 includes a current mirror 440, which has an input terminal 442 that receives the feedback-signal 404 from the optocoupler-phototransistor 421. The input terminal 442 of the current mirror 440 behaves like a voltage source with low input impedance, and with a fixed voltage level Vin. The current mirror 440 also has an output terminal that is connected to ground by a resistor 446. An output signal (V1) 448 can be tapped off at a node between the output terminal 444 of the current mirror 440 and the resistor 446. Use of the resistor 446 provides the output signal (V1) 448 in the voltage domain. As will be discussed in more detail below, this output signal (V1) 448 can be provided as a feedback-signal for subsequent processing in order to provide a normal-mode-control-signal and a burst-mode-control-signal (as shown in FIG. 10).

A low input impedance at the input terminal 442 of the current mirror 440 ensures that the parasitic capacitance at the output of the optocoupler 419 is effectively shorted. Also the feedback from a miller capacitance of the optocoupler-phototransistor 421 to its base is effectively reduced such that a maximum bandwidth of the optocoupler 419 can be utilized. Therefore, use of the current mirror 440 may enable the optocoupler 419 to adequately communicate signals with a greater range of frequencies than would otherwise be possible.

Figure 5:
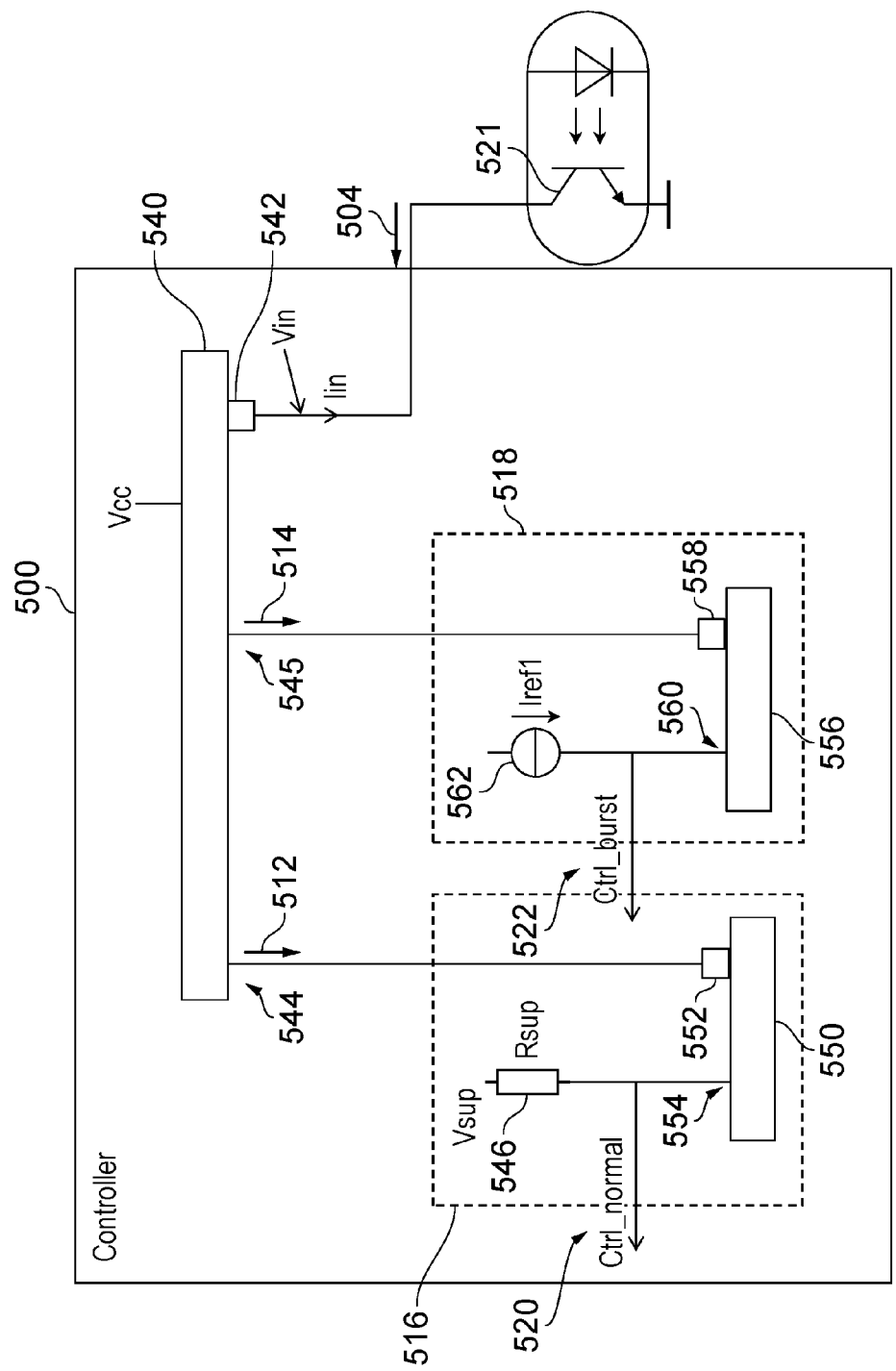
FIG. 5 shows an example of a control arrangement that includes a current mirror.

FIG. 5 shows a control arrangement 500 that includes a current mirror 540 such that different circuit paths can be used for generating a Ctrl_normal signal 520 and a Ctrl_burst signal 522. The Ctrl_normal signal 520 is an example of a normal-mode-control-signal. The Ctrl_burst signal 522 is an example of a burst-mode-control-signal. In the embodiment shown in FIG. 5, this functionality is implemented by using a first current mirror 540 to mirror a current signal received from an optocoupler-phototransistor 521 (which may be referred to as an "optocoupler current") and then using different outputs of the current mirror 540 to split the feedback signal in order to control the burst mode and normal mode.

The control arrangement 500 has an input terminal, which receives a feedback signal 504 from the optocoupler-phototransistor 521. The feedback signal 504 has a current value of Iin. In a similar way to that described with reference to FIG. 4, the feedback signal 504 is provided to an input terminal 542 of the first current mirror 540. In this example, the first current mirror 540 has a first-output-terminal 544 and a second-output-terminal 545. The first-output-terminal 544 provides a first-feedback-signal 512 to a normal-mode-processing-arrangement 516, for providing the Ctrl_normal signal 520. The second-output-terminal 545 provides a second-feedback-signal 514 to a burst-mode-processing-arrangement 518, for providing the Ctrl_burst signal 522. In this way, the first current mirror 540 provides the functionality of a splitter that delivers the feedback-signal 504 to both the normal-mode-processing-arrangement 516 and the burst-mode-processing-arrangement 518.

In this example, the normal-mode-processing-arrangement 516 includes a second current mirror 550, which has a second-current-mirror-input-terminal 552 and a second-current-mirror-output-terminal 554. The second-current-mirror-input-terminal 552 receives the first-feedback-signal 512 from the first current mirror 540. The second-current-mirror-output-terminal 554 is connected to an internal supply voltage Vsup, through an Rsup resistor 546. The Ctrl_normal signal 520 can be tapped off at a node between the second-current-mirror-input-terminal 552 and the Rsup resistor 546. In this way, the node between the second-current-mirror-input-terminal 552 and the Rsup resistor 546 can be considered as a normal-mode-output-terminal of the normal-mode-processing-arrangement 516. In a similar way to that described above with reference to FIG. 4, the Ctrl_normal signal 520 is a signal in the voltage domain.

The Ctrl_normal signal 520 can be used to control the output power of the SMPS during a normal mode of operation. The Ctrl_normal signal 520 is defined by:
Vsup−(Iopto×Rsup), where Iopto is a current in the optocoupler (feedback signal 504) (for simplicity, the transfer ratio of the current mirrors is assumed to be 1 in this equation).

If a constant value of Vsup is used, the optocoupler current (Iopto) during normal operation is not constant, but depends on a power level set by the controller. In some examples, the normal-mode-processing-arrangement 516 can include a filter component (not shown) that filters the signal provided at a node between the second-current-mirror-input-terminal 552 and the Rsup resistor 546 before providing the Ctrl_normal signal 520. In this way, high frequency (HF) disturbances can be filtered out before generating a switch-control-signal for the converter. Vsup may be regulated such that a current in Rsup is regulated towards a reference value Iref=(Vsup−Ctrl_normal]/Rsup], where Iref has a predetermined relation with Iref1 supplied by a reference-current-source 562 (discussed below). For example, the predetermined relationship may be a fixed difference such as Iref1=100 µA and Iref=80 µA.

In this example, the burst-mode-processing-arrangement 518 includes a third current mirror 556, which has a third-current-mirror-input-terminal 558 and a third-current-mirror-output-terminal 560. The third-current-mirror-input-terminal 558 receives the second-feedback-signal 514 from the first current mirror 540. The third-current-mirror-output-terminal 560 is connected to a reference-current-source 562, which provides a burst-mode-reference-current Iref1. The Ctrl_burst signal 522 can be tapped off at a node between the third-current-mirror-input-terminal 560 and the reference-current-source 562 (this node will be referred to as a Ctrl_burst_node). In this way, the Ctrl_burst_node can be considered as a burst-mode-output-terminal of the burst-mode-processing-arrangement 518. In one implementation, the Ctrl_burst signal 522 is a signal in the current domain. Alternatively, the Ctrl_burst signal 522 may be a voltage domain signal; as the impedance at the Ctrl_burst_node is almost infinite, a transfer takes place between the voltage domain and the current domain: V(node)]=(I(reference-current-source 562)−I(third-current-mirror-input-terminal 560)*Rnode), where Rout is the impedance at the Ctrl_burst_node. As Rnode is infinite as long as V(node) is at a level between ground and the internal supply voltage of the SMPS. In effective, V(node) switches from a low level (ground) to a high level and vice versa when I(reference-current-source 562) equals/passes I(third-current-mirror-input-terminal 560)

The Ctrl_burst signal 522 is used to control the SMPS in a burst mode of operation. The Ctrl_burst signal 522 in this example is effectively a digital signal, which is high if Iin<Iref1 and low if Iin>Iref1, where Iin is the level of the current signal received from the optocoupler-phototransistor 521. Burst-mode-reference-current Iref1 can be considered as a burst-mode-reference-signal. As will be illustrated with reference to FIG. 6, this feature allows a burst-on-time to be started at a fixed value for the optocoupler current (Iin). Also, for examples in which the level of the Ctrl_normal signal 520 is regulated in accordance with a normal-mode-reference-signal, a relationship between the normal-mode-reference-signal and the burst-mode-reference-signal can be set such that it corresponds to the predetermined relationship between the feedback signal in the normal mode of operation and the feedback signal in the burst mode of operation.

Figure 6:
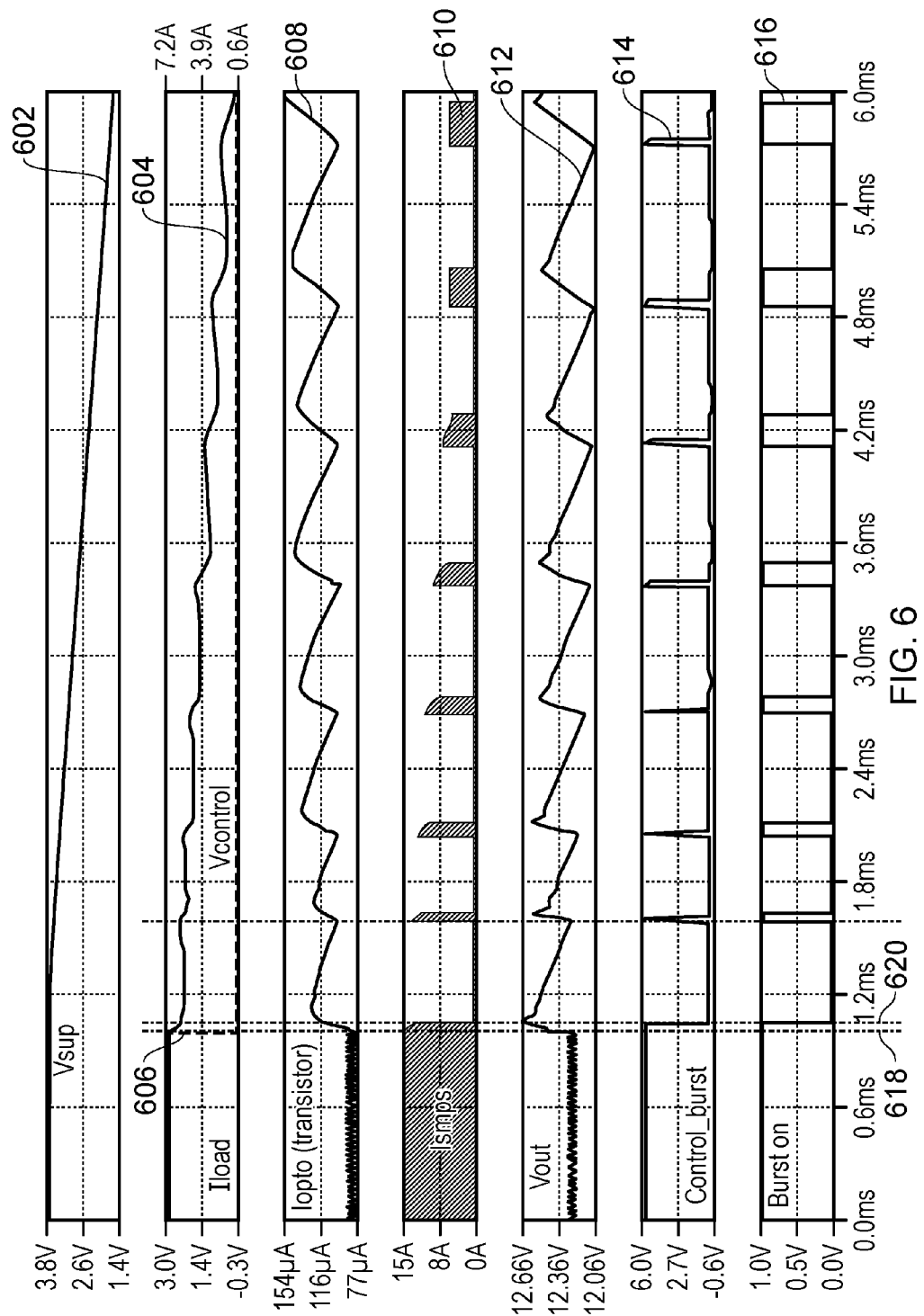
FIG. 6 shows signals for a simulation of the control arrangement of FIG. 5.

FIG. 6 shows signals for a simulation of the control arrangement of FIG. 5, and includes similar signals to those described with reference to FIG. 2 above, namely:
Vsup signal 602;
Iload signal 606;
Vcontrol signal 604;
Iopto(transistor) signal 608;
Ismps signal 610;
Vout signal 612;
Control_burst signal 614; and
Burst-on signal 616.

The optocoupler current (Iopto(transistor) signal 608) provides a feedback signal for the SMPS. FIG. 6 illustrates operation in which a Ctrl_normal signal is regulated in accordance with a normal-mode-reference-signal, when the SMPS is operating in a normal mode of operation. By regulating the Ctrl_normal signal in this way, the Iopto (transistor) signal 608 is also regulated to a reference value, which in this example is 80 µA. Also, a burst-mode-reference-signal (Iref1 referred to in relation to FIG. 5), which is used to define a level of the Iopto(transistor) signal 608 that is used to transition to the burst mode of operation, is set as 100 µA. Use of such a normal-mode-reference-signal and a burst-mode-reference-signal can be considered as operating the SMPS such that the feedback signal in the normal mode of operation has a predetermined relationship with the feedback signal in the burst mode of operation. In this example the predetermined relationship is a fixed/constant difference of 20 µA.

Due to the split, and/or due to the fixed difference between (i) the regulated value of the Iopto(transistor) signal 608 in the normal mode of operation, and (ii) the level of the Iopto(transistor) signal 608 that is used to transition to the burst mode of operation, the signal Ctrl_burst 614 can now be set such that the control arrangement can quickly react when the Iopto(transistor) signal 608 crosses the 100 µA level. This allows a normal mode of operation (which may be considered as a constant burst-on interval) to be finished relatively quickly.

As shown in FIG. 6, a load step in Iload 206 is made to 600 mA at t=1 ms. As result of the load step, the Iopto (transistor) signal 608 increases and therefore Vcontrol 604 drops. When the Iopto(transistor) signal 608 gets to 100 µA, the control_burst signal 614 transitions to low. When the control_burst signal 614 transitions to low, an internal burst-on counter starts counting and when a desired burst-on duration is reached, the primary side controller sets the burst_on signal 616 to low. In the example of FIG. 6, the period of time between the control_burst signal 614 going high and the burst_on signal 616 going high is very short in FIG. 6.

When the burst_on signal 616 is set to low, switching of the converter stops and therefore the Ismps signal 610 stays low. When the Ismps signal 610 stays low, the Vout signal 612 starts to fall. As shown in FIG. 6 between the vertical dot-dashed lines shown with references 618, 620, the period of time between the Iload signal 606 going low and the Vout signal 612 starting to fall is shorter than that shown in FIG. 2. In FIG. 6, this delay is about 0.06 µs, whereas in FIG. 2 the delay is about 0.2 µs. The reduction in the time delay results in an improvement in the overshoot of the Vout signal 612 because it is reduced from about 0.9V (7.5%) for FIG. 2, to about 0.4V (3.3%) for FIG. 6. This improved performance can be achieved because the Iopto(transistor) signal 608 only has to rise from 80 µA to 100 µA. As discussed above with reference to FIG. 5, the control arrangement has separate path for a normal mode of operation (DC 80 µA regulated, but AC maintaining a resistor characteristic) and burst mode (100 µA current source).

FIG. 6 shows that the Vsup signal 602 is regulated such that a steady state Iopto(transistor) 608 of for example 80 µA is provided. This introduces an opportunity to set the Iopto (transistor) signal 608 for starting the burst-on-time to a level related to the Vsup regulation level by setting the burst-mode-reference-signal to an appropriate level, for example Iopto=100 µA. This can result in a fixed distance between the two signals (the burst-mode-reference-signal and the normal-mode-reference-signal), thereby minimizing or reducing the reaction time in case of a load step.

In the example illustrated with reference to FIG. 6, the duration of a burst-on-time is set by a local loop in order to provide a certain burst period time. That is, there is no mechanism that finishes the burst-on-time when a sudden load step requires this, for example when a reduction in power is required at the output of the SMPS at a time at which the SMPS is operating in a burst mode of operation. Also, in examples where a burst-on-time is finished by the feedback loop, this can be an issue because the speed of the feedback loop can be limited. The results is an overshoot at Vout, which can be outside the limits of the requirements for some applications.

Figure 7:
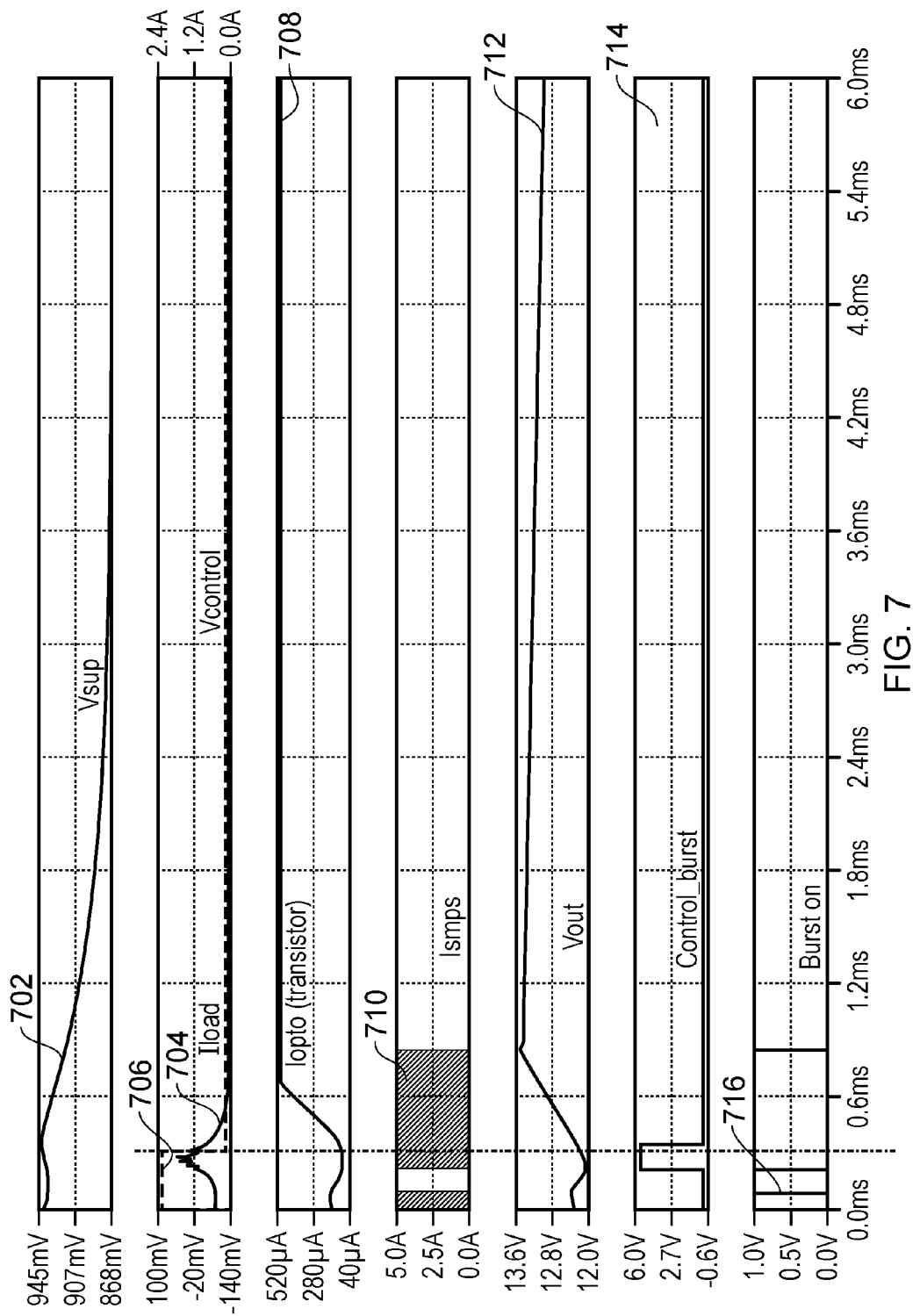
FIG. 7 shows signals from a simulation of another example control arrangement.

FIG. 7 illustrates signals from a simulation of an example control arrangement for an SMPS for which there is no mechanism to end a burst-on-time before expiry of a predetermined period of the burst-on-time. FIG. 7 shows similar signals to those described above with reference to FIGS. 2 and 6.

At t=0 s, the system is in a steady state with a burst-on time of 500 µs and a load current of 2.2A. At t=0.5 ms, a load step occurs to Iload=0.1A. At t=0.5 ms, the system happens to be at the beginning of a burst-on interval. The reduction in the Iload signal 706 causes the Vout signal 712 to rapidly increase. By the time the predetermined period of the burst-on-time is finished and the SMPS is switched off, the Vout signal 712 has risen to 13.5V, whereas the desired value for the output voltage of the SMPS is 12V. This 1.5V overshoot represents a 12% overshoot, which can be unacceptable in some applications.

Figure 8:
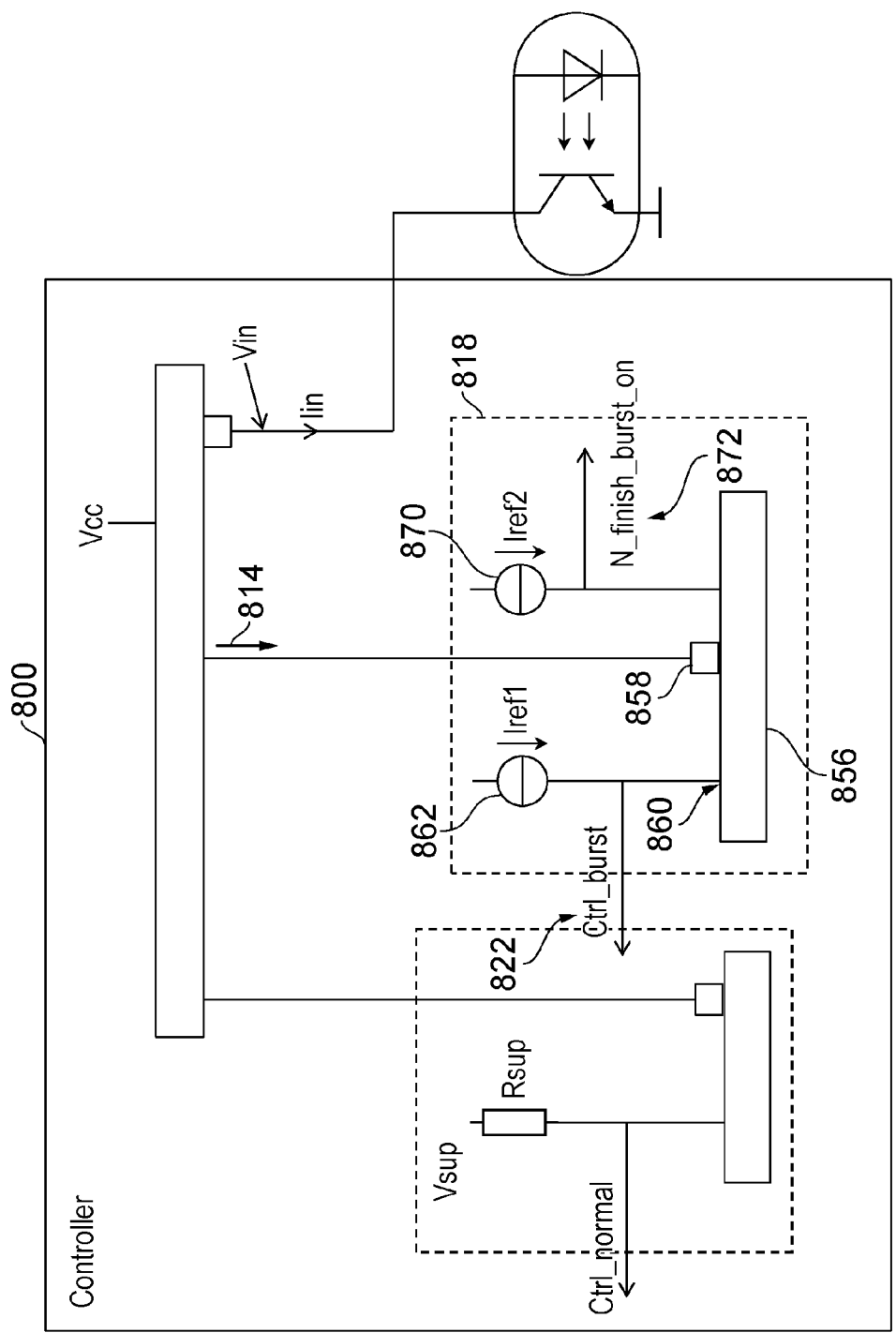
FIG. 8 shows another example of a control arrangement.

FIG. 8 shows a control arrangement 800 that is similar to the control arrangement of FIG. 5. Features of FIG. 8 that have already been described with reference to FIG. 5 will not necessarily be described again here.

The control arrangement 800 of FIG. 8 has a burst-mode-processing-arrangement 818 that includes a third current mirror 856. The third current mirror 856 has a third-current-mirror-input-terminal 858 and a third-current-mirror-output-terminal 860. The third-current-mirror-input-terminal 858 receives a second-feedback-signal 814. A signal provided at the third-current-mirror-output-terminal 860 is used to provide the Ctrl_burst signal 822 in the same way as FIG. 5. That is, a feedback current Iin is compared with a burst-mode-reference-signal Iref1, wherein the burst-mode-reference-signal Iref1 is provided by a reference-current-source 862.

In this example, the third current mirror 856 also has a burst-off-current-mirror-output-terminal 860, which provides a copy of the second-feedback-signal 814. The burst-off-current-mirror-output-terminal 860 is connected to a burst-off-reference-current-source 870, which provides a current with a value of Iref2. An N_finish_burst_on signal 872 can be tapped off at a node between the burst-off-current-mirror-output-terminal 860 and the burst-off-reference-current-source 870. In this way, the node between the burst-off-current-mirror-output-terminal 860 and the burst-off-reference-current-source 870 can be considered as an end-burst-mode-output-terminal. When Iin becomes larger than Iref2, N_finish_burst_on becomes low, which can be interpreted by a primary controller as a command to finish an active burst-on-interval. In this example, the burst-off-reference-current-source 870 has a value of Iref2=200 µA. In this implementation, the N_finish_burst_on signal 872 is a signal in the current domain. Alternatively, the N_finish_burst_on signal 872 may be a signal in the voltage domain, as discussed above with reference to FIG. 5.

The burst-off-current-mirror-output-terminal 860 and the burst-off-reference-current-source 870 can together be referred to as an end-burst-mode-processing-arrangement, which may be part of, or separate from the burst-mode-processing-arrangement 818. As will be described with reference to FIG. 9, the end-burst-mode-processing-arrangement compare the second-feedback-signal 814 with a second reference signal (Iref2) in order to provide the end-burst-mode-control-signal 872 to the end-burst-mode-output-terminal. In this way, a burst-on-time can be finished when an optocoupler current exceeds a threshold during the burst-on-interval. This feature can be important when a load step from a high power level in burst mode to a low power level in burst mode occurs.

Figure 9:
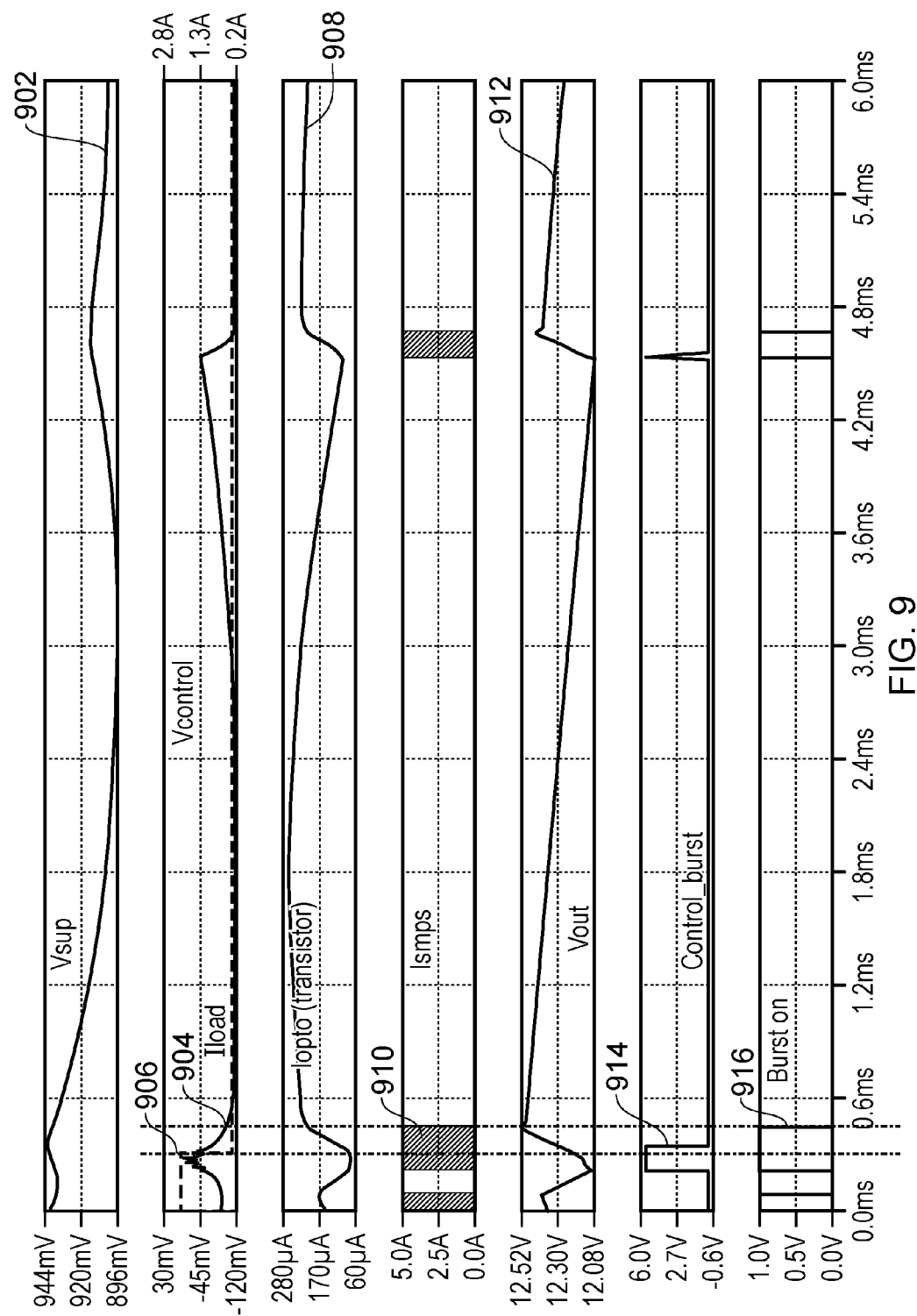
FIG. 9 shows signals for a simulation of the control arrangement of FIG. 8.

FIG. 9 shows signals for a simulation of the control arrangement of FIG. 8. FIG. 9 shows similar types of signals to those described above with reference to FIG. 7.

At t=0 s, the system is in steady state with a burst-on time of 500 µs and a load current of 2.2A. At t=0.5 ms, a load step occurs to Iload=0.1A. At t=0.5 ms, the system happens to be at the beginning of a burst-on interval. The reduction in the Iload signal 906 causes the Vout signal 912 to rapidly increase. This causes the opto current (Iopto(transistor) 908) to increase. In this example, due to the end-burst-mode-processing-arrangement of FIG. 8, when the opto current (Iopto(transistor) 908) reaches a level of Iopto=Iref2=200 µA, the N_finish_burst_on signal (not shown) goes low, which causes the primary controller to set the burst-on signal 916 as low. When the burst-on signal 916 is set low, the SMPS is switched off, the Ismps signal 910 goes low, and the burst-on-time is finished. As can be seen in FIG. 9, this operation enables the SMPS to be switched off sooner after the step change in the Iload signal 906 such that the overshoot of the Vout signal 912 is limited to 0.5V (4%), which is within a 5% requirement.

FIG. 10 shows another example of a control arrangement 1000. In this example, a normal-mode-processing-arrangement 1016 is provided as a digital implementation, and analogue implementations are used for a burst-mode-processing-arrangement 1018 and an end-burst-mode-processing-arrangement 1019.

In the same way as described with reference to FIG. 4, a current mirror 1040 is used to convert an optocoupler current into an analogue voltage signal V1. This analogue voltage signal V1 is then provided as a feedback signal to each of the normal-mode-processing-arrangement 1016, the burst-mode-processing-arrangement 1018 and the end-burst-mode-processing-arrangement 1019.

The normal-mode-processing-arrangement 1016 in this example includes an analogue-to-digital (A/D) converter 1080 that converts the analogue voltage signal V1 into a digital-feedback-signal Ctrl_FB. This digital-feedback-signal is a digital representation of the optocoupler current Iin. The digital-feedback-signal Ctrl_FB is provided to a first input terminal of an offset-application-component 1088, which may be a summation component or a subtraction component. The digital-feedback-signal Ctrl_FB is also provided to a first input terminal of an offset-determination-component 1082. A normal-mode-reference signal Ctrl_fb_ref 1084 is provided to a second input terminal of the offset-determination-component 1082. The offset-determination-component 1082 compares the normal-mode-reference signal Ctrl_fb_ref 1084 with the digital-feedback-signal Ctrl_FB and provides an offset-signal representative of the difference between the two signals. The offset-determination-component 1082 may be a summation or subtraction component. The normal-mode-reference signal Ctrl_fb_ref 1084 may be referred to as an offset-reference-signal.

In this example, the normal-mode-processing-arrangement 1016 also includes an offset-integrator 1086 which integrates the offset-signal provided by the offset-determination-component 1082 in order to provide a time-averaged-offset-signal Ctrl_offset. The offset-integrator 1086 may be a low pass filter such that the time-averaged-offset-signal Ctrl_fb_offset does not include high frequency variations in the offset-signal, and therefore can enable more stable operation of the SMPS. The time-averaged-offset-signal Ctrl_fb_offset is provided to a second terminal of the offset-application-component 1088. The output terminal of the offset-application-component 1088 provides a normal-mode-control-signal Ctrl_normal 1020. In this way, the signal Ctrl_normal is the difference between the Ctrl_fb_offset signal 1084 and the Ctrl_FB signal. This is similar to the analogue representation of the resistor Rsup in FIG. 8, where Ctrl_fb_offset is similar to Vsup.

In order to link the normal-mode-processing-arrangement 1016 of FIG. 10 with the simulation results of FIG. 6, the level of the normal-mode-reference signal Ctrl_fb_ref 1084 can be set at a value that corresponds to an optocoupler current (Iopto(transistor)) of 80 µA.

Turning now to the burst-mode-processing-arrangement 1018, the analogue voltage signal V1 is provided to a first input terminal of a burst-mode-comparator 1090. A burst-mode-reference-signal Vrefburst 1062 is provided to a second input terminal of the burst-mode-comparator 1090. An output terminal of the burst-mode-comparator 1090 can provide a burst-mode-control-signal Ctrl_burst 1022, in accordance with a comparison between the burst-mode-reference-signal Vrefburst 1062 and the analogue voltage signal V1 (feedback signal).

In order to link the burst-mode-processing-arrangement 1018 of FIG. 10 with the simulation results of FIG. 6, the level of the burst-mode-reference-signal Vrefburst 1062 can be set at a value that corresponds to an optocoupler current (Iopto(transistor)) of 100 µA.

In the example of FIG. 10, the normal-mode-processing-arrangement 1016 can be considered as:
  determining a normal-mode-adaptive-offset-signal (the offset-signal or the time-averaged-time-offset-signal (Ctrl_fb_offset)) in accordance with a result of the comparison between a feedback signal (analogue voltage signal V1) and a normal-mode-reference-signal (Ctrl_fb_ref 1084); and
  adding the normal-mode-adaptive-offset-signal (the offset-signal or the time-averaged-time-offset-signal (Ctrl_fb_offset)) to the feedback-signal (analogue voltage signal V1) in order to provide the normal-mode-control-signal (Ctrl_normal 1020).

The burst-mode-processing-arrangement 1018 can be considered as setting a burst-mode-control-signal (Ctrl_burst 1022) as the result of a comparison between a feedback-signal (analogue voltage signal V1) and a burst-mode-reference-signal (Vrefburst 1062).

In this way, the normal-mode-processing-arrangement 1016 compares the feedback signal (V1) with a normal-mode-reference-signal (Ctrl_fb_ref 1084), and the burst-mode-processing-arrangement 1018 compares the feedback signal (V1) with a burst-mode-reference-signal (Vrefburst 1062), such that a relationship between the normal-mode-reference-signal (Ctrl_fb_ref 1084) and the burst-mode-reference-signal (Vrefburst 1062) corresponds to a predetermined relationship between the feedback signal (V1) in the normal mode of operation and the feedback signal (V1) in the burst mode of operation.

Turning now to the end-burst-mode-processing-arrangement 1019, the analogue voltage signal V1 is provided to a first input terminal of an end-burst-comparator 1092. An end-burst-reference-signal Vrefmax 1070 is provided to a second input terminal of the end-burst-comparator 1092. An output terminal of the end-burst-comparator 1092 can provide an end-burst-control-signal Ctrl_burst_max 1072, in accordance with a comparison between the end-burst-reference-signal Vrefmax 1070 and the analogue voltage signal V1 (feedback signal).

In order to link the end-burst-mode-processing-arrangement 1019 of FIG. 10 with the simulation results of FIG. 9, the level of the end-burst-reference-signal Vrefmax 1070 can be set at a value that corresponds to an optocoupler current (Iopto(transistor)) of 200 µA.

The end-burst-mode-processing-arrangement 1019 can be considered as setting an end-burst-mode-control-signal (Ctrl_burst_max 1072) as the result of a comparison between a feedback-signal (analogue voltage signal V1) and an end-burst-mode-reference-signal (Vrefmax 1070).

In this way, the end-burst-mode-processing-arrangement 1019 compares the feedback signal (V1) with the burst-mode-reference-signal (Vrefmax 1070), such that a relationship between the normal-mode-reference-signal (Ctrl_fb_ref 1084) and the end-burst-mode-reference-signal (Vrefmax 1070) corresponds to a predetermined relationship between the feedback signal (V1) in the normal mode of operation and the feedback signal (V1) in the burst mode of operation.

In the example of FIG. 10, a split in the signal paths is provided at the level of the offset-application-component 1088, as from that point onwards there is no direct relation anymore between V1 and Ctrl_normal 1020.

An additional advantage of the control arrangement of FIG. 10 relates to power consumption of the primary controller, which may be an IC. At no load, there can be a requirement that the no-load-input-power is not too high. This is the power taken from the mains when no load is connected. As an example, a no-load-input-power of less than 50-100 mW may be required. Advantageously, in order to reduce power consumption at no-load, one or more parts of the primary controller IC can be put into a sleep mode during a burst-off interval. In the example of FIG. 10, the normal-mode-processing-arrangement 1016 and the end-burst-mode-processing-arrangement 1019 can be switched off during a burst-off interval. In such a sleep mode, only the burst-mode-processing-arrangement 1018 may need to be kept active in order to continue operating at an acceptable level.

This advantageous reduction in power consumption can be achieved because the burst-mode-processing-arrangement 1018 is separate from both the normal-mode-processing-arrangement 1016 and the end-burst-mode-processingarrangement 1019. In other words, the feedback signal V1 is split before it is processed by these arrangements. This can mean that that the Ctrl_burst signal 1018 can be maintained while the other signals (Ctrl_normal 1020 and Ctrl_max_burst 1072, and also a digital clock signal that may be used by the A/D 1080) are disabled in order to save power consumption.

Figure 11:
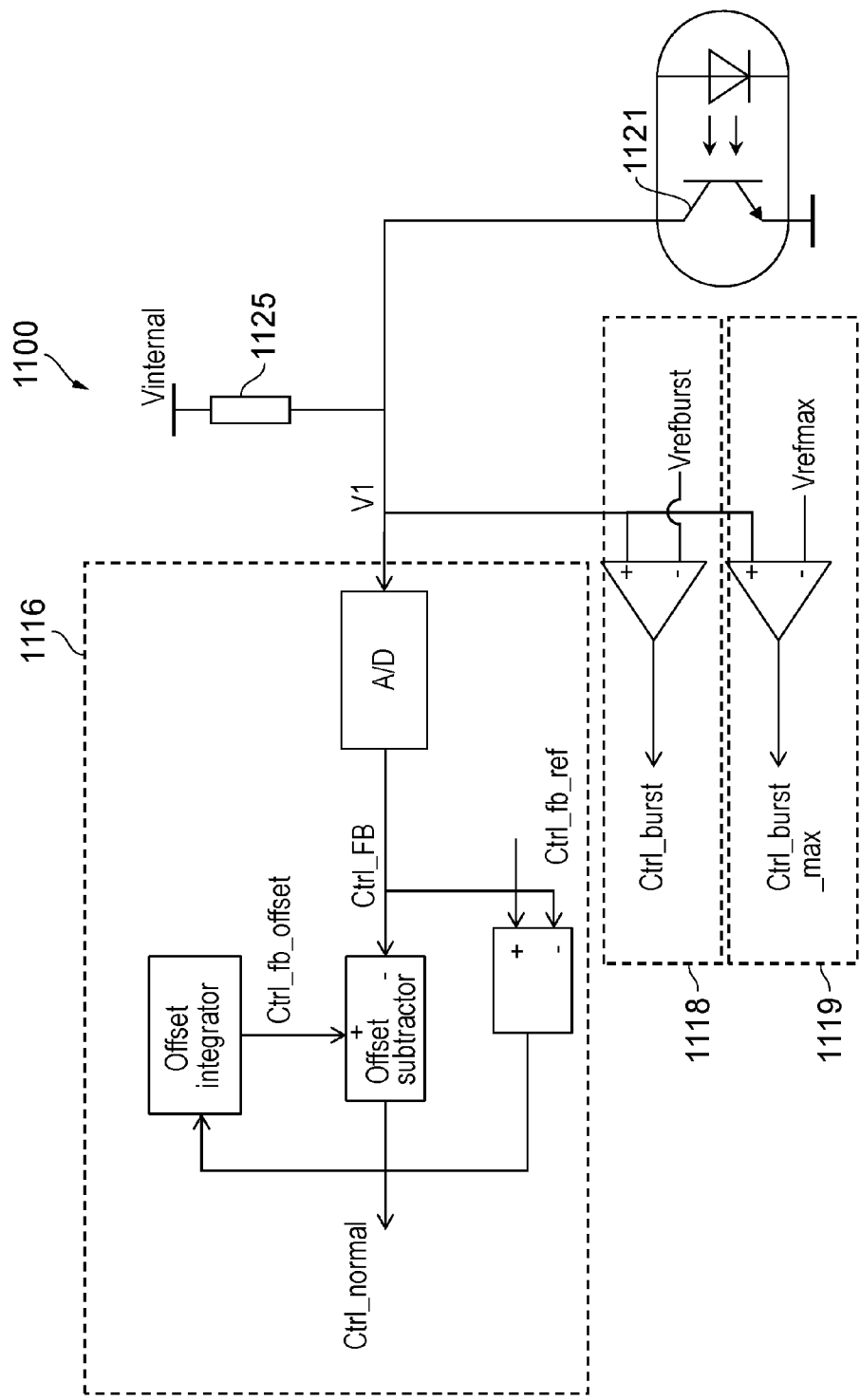

FIG. 11 shows another example of a control arrangement 1100, which is similar to that of FIG. 10. Features of FIG. 11 that have already been described with reference to FIG. 10 will not necessarily be described again here.

In this example, the control arrangement 1100 provides a feedback signal in the voltage domain V1 to each of the normal-mode-processing-arrangement 1116, the burst-mode-processing-arrangement 1118 and the end-burst-mode-processing-arrangement 1119. The control arrangement 1100 of FIG. 11 does not include a current mirror. Instead, the optocoupler-phototransistor 1121 is connected in series with a resistor 1125 between an internal supply voltage (Vinternal) and ground. The signal at the node between the optocoupler-phototransistor 1121 and the resistor 1125 can be considered as the voltage domain feedback signal V1 or alternatively as a signal in the current domain.

One or more of the examples disclosed herein can be used in an adapters for laptops, PC desktop supplies, TV supplies, other supplies for power larger than 75 W, and equipment for inductive cooking, as non-limiting examples.

It will be appreciated that examples disclosed herein need not necessarily receive a feedback signal from an optocoupler. Instead, communication of information between a secondary side and a primary side of an SMPS can be provided in a different way. For example, by RF communication or using the main transformer. In general, any communication method for sending information representative of Vout, or an error signal resulting from comparison between Vout and a reference, to the primary side can be used.

It will be appreciated that the given embodiments are not limiting. For example any splitting of a feedback signal can be performed at different places. Also, analogue or digital implementations can be used, or a combination of the two.

It will be appreciated that any components that are described or illustrated herein as being coupled or connected could be directly or indirectly coupled or connected. That is, one or more components could be located between two components that are said to be coupled or connected whilst still enabling the required functionality to be achieved.

The present disclosure can also be considered as providing examples of a method for controlling the power of an SMPS including a normal operation mode and a burst mode, where the feedback signal is split up in different paths for burst mode and normal mode. In this way, the feedback signal can be split up of for burst mode and normal mode. This allows the performance of the SMPS to be optimized for the contradictory requirements of burst mode and normal mode operation. The feedback signal may be a current in an optocoupler of the SMPS. A burst-on interval may be finished when the feedback signal exceeds a threshold. Where the feedback signal is an output of an optocoupler, the optocoupler may be connected to an input that behaves as a voltage source. A voltage, current or digital word may be used for the feedback signal. The optocoupler output may be connected to a voltage source, short-circuiting the parasitic capacitance. The optocoupler current for starting a burst-on time may be fixed. This can provide an optimum/improved Vout response independent of history. No, or reduced, undesired delays may occur due to parasitic capacitance at the input terminal. Also, a burst-on time can be finished while a negative load step occurs. Instead of, or in addition to, adapting a setting of the normal mode (such as Vsup of Ctrl_fb_offset), a setting of the burst mode may be adapted in order to define a predetermined relationship between the setting of the normal mode and burst mode. In the case where the SMPS comprises an optocoupler, adapting a setting of the normal mode, as opposed to the burst mode, may be preferred because it requires a lower level of optocoupler current.

Examples disclosed herein can enable the possibility for use of a split path for both normal mode and burst mode operation of a SMPS controller. The split paths give the possibility to combine a low optocoupler current loop (as discussed above) with a desired level of the optocoupler current for burst mode. As the optocoupler current is regulated to a fixed level in steady state, optimum or improved performance in burst mode may be realized if the optocoupler current for the burst mode levels is related to the fixed level used in the normal mode. According to this feature, a level that is directly related to the optocoupler current can be used for controlling the burst mode, while for normal operation a different path is used.

The invention claimed is:

1. A control arrangement for a SMPS, the control arrangement comprising:
   an input terminal configured to receive a feedback-signal representative of an output of the SMPS;
   a normal-mode-processing-arrangement configured to process the feedback-signal and provide a normal-mode-control-signal for operating the SMPS in a normal mode of operation;
   a burst-mode-processing-arrangement configured to process the feedback-signal and provide a burst-mode-control-signal for operating the SMPS in a burst mode of operation;
   a feedback-control-processing-arrangement configured to operate the SMPS such that the feedback signal in the normal mode of operation has a predetermined relationship with the feedback signal in the burst mode of operation; and
   a current mirror, the current mirror comprising:
      an input terminal configured to receive a current-domain-feedback-signal, wherein the input terminal is configured to behave like a voltage source with a fixed voltage level; and
      an output terminal configured to provide the feedback-signal.

2. The control arrangement of claim 1, wherein a level of the feedback signal in the normal mode of operation has a predetermined relationship with a level of the feedback signal that is used to transition to the burst mode of operation.

3. The control arrangement of claim 1, wherein the predetermined relationship is fixed/constant difference.

4. The control arrangement of claim 1, wherein:
   the normal-mode-processing-arrangement is configured to compare the feedback signal with a normal-mode-reference-signal; and
   the burst-mode-processing-arrangement is configured to compare the feedback signal with a burst-mode-reference-signal;
   wherein a relationship between the normal-mode-reference-signal and the burst-mode-reference-signal corresponds to the predetermined relationship between the feedback signal in the normal mode of operation and the feedback signal in the burst mode of operation.

5. The control arrangement of claim 4, wherein the normal-mode-processing-arrangement is configured to:
   determine a normal-mode-adaptive-offset-signal in accordance with a result of the comparison between the feedback signal and the normal-mode-reference-signal; and
   add the normal-mode-adaptive-offset-signal to the feedback-signal in order to provide the normal-mode-control-signal.

6. The control arrangement of claim 5, wherein the burst-mode-processing-arrangement is configured to set the burst-mode-control-signal as the result of the comparison between the feedback-signal and the burst-mode-reference-signal.

7. The control arrangement of claim 4, wherein the normal-mode-processing-arrangement is configured to set the normal-mode-control-signal as the result of the comparison between the feedback-signal and the normal-mode-reference-signal.

8. The control arrangement of claim 4, wherein the burst-mode-processing-arrangement is configured to:
   determine a burst-mode-adaptive-offset-signal in accordance with a result of the comparison between the feedback signal and the burst-mode-reference-signal; and
   add the burst-mode-adaptive-offset-signal to the feedback-signal in order to provide the burst-mode-control-signal.

9. The control arrangement of claim 4, wherein:
   the normal-mode-processing-arrangement is configured to set the normal-mode-control-signal in accordance with a result of the comparison between the feedback signal and the normal-mode-reference-signal; or
   the burst-mode-processing-arrangement is configured to set the burst-mode-control-signal in accordance with a result of the comparison between the feedback signal and the burst-mode-reference-signal.

10. The control arrangement of claim 1, wherein the feedback-control-processing-arrangement comprises an offset-summation-component configured to provide the normal-mode-control-signal by adding an adaptive-offset-signal to the feedback-signal.

11. The control arrangement of claim 10, wherein the feedback-control-processing-arrangement further comprises an offset-determination-component configured to provide the adaptive-offset-signal in accordance with a difference between the feedback signal and a normal-mode-reference-signal.

12. The control arrangement of claim 10, wherein the feedback-control-processing-arrangement further comprises an offset-integrator-component configured to low pass filter the adaptive-offset-signal before it is provided to the offset-summation-component.

13. The control arrangement of claim 1, comprising:
   an end-burst-mode-output-terminal; and
   an end-burst-mode-processing-arrangement configured to compare the feedback-signal with an end-burst-reference-signal, and provide an end-burst-mode-control-signal to the end-burst-mode-output-terminal.

14. The control arrangement of claim 13, wherein the end-burst-reference-signal has a predetermined relationship with the normal-mode-reference-signal or the burst-mode-reference-signal.

15. A control arrangement for a SMPS, the control arrangement comprising:
   an input terminal configured to receive a feedback-signal representative of an output of the SMPS;
   a normal-mode-processing-arrangement configured to process the feedback-signal and provide a normal-mode-control-signal for operating the SMPS in a normal mode of operation;
   a burst-mode-processing-arrangement configured to process the feedback-signal and provide a burst-mode-control-signal for operating the SMPS in a burst mode of operation; and
   a feedback-control-processing-arrangement configured to operate the SMPS such that the feedback signal in the normal mode of operation has a predetermined relationship with the feedback signal in the burst mode of operation;
   wherein the normal-mode-processing-arrangement is configured to compare the feedback signal with a normal-mode-reference-signal;
   wherein the burst-mode-processing-arrangement is configured to compare the feedback signal with a burst-mode-reference-signal;
   wherein a relationship between the normal-mode-reference-signal and the burst-mode-reference-signal corresponds to the predetermined relationship between the feedback signal in the normal mode of operation and the feedback signal in the burst mode of operation; and
   wherein the normal-mode-processing-arrangement is configured to:
      determine a normal-mode-adaptive-offset-signal in accordance with a result of the comparison between the feedback signal and the normal-mode-reference-signal; and
      add the normal-mode-adaptive-offset-signal to the feedback-signal in order to provide the normal-mode-control-signal.

16. A control arrangement for a SMPS, the control arrangement comprising:
   an input terminal configured to receive a feedback-signal representative of an output of the SMPS;
   a normal-mode-processing-arrangement configured to process the feedback-signal and provide a normal-mode-control-signal for operating the SMPS in a normal mode of operation;
   a burst-mode-processing-arrangement configured to process the feedback-signal and provide a burst-mode-control-signal for operating the SMPS in a burst mode of operation; and
   a feedback-control-processing-arrangement configured to operate the SMPS such that the feedback signal in the normal mode of operation has a predetermined relationship with the feedback signal in the burst mode of operation;
   wherein the feedback-control-processing-arrangement comprises an offset-summation-component configured to provide the normal-mode-control-signal by adding an adaptive-offset-signal to the feedback-signal.

* * * * *